United States Patent
Smyth

(10) Patent No.: US 6,921,138 B2
(45) Date of Patent: Jul. 26, 2005

(54) MULTI-PIECE VEHICLE WHEEL ASSEMBLY

(76) Inventor: Larry C. Smyth, 16108 River Point Dr., Charlotte, NC (US) 28278

( * ) Notice: Subject to any disclaimer, the term of this patent is extended or adjusted under 35 U.S.C. 154(b) by 0 days.

(21) Appl. No.: 10/639,695

(22) Filed: Aug. 12, 2003

(65) Prior Publication Data

US 2004/0032161 A1 Feb. 19, 2004

Related U.S. Application Data

(60) Provisional application No. 60/402,691, filed on Aug. 12, 2002.

(51) Int. Cl.$^7$ .............................................. B60B 23/06
(52) U.S. Cl. ...................................... 301/11.1; 301/10.1
(58) Field of Search .................................. 301/9.1, 10.1, 301/11.1, 64.201, 64.202, 64.301, 65

(56) References Cited

U.S. PATENT DOCUMENTS

| | | | |
|---|---|---|---|
| 1,566,344 A | * 12/1925 | Perrot et al. ................... | 301/65 |
| 1,652,653 A | * 12/1927 | Whitcomb ............. | 301/63.108 |
| 2,439,881 A | * 4/1948 | Ash ............................ | 301/65 |
| 2,948,055 A | 9/1960 | Baxter et al. | |
| 3,964,144 A | 6/1976 | Kopp | |
| 4,436,133 A | 3/1984 | Rohr | |
| 4,866,834 A | 9/1989 | Winkler et al. | |
| 4,982,998 A | 1/1991 | Mikawa | |
| 4,997,235 A | 3/1991 | Braungart | |
| 5,023,983 A | 6/1991 | Winkler et al. | |
| 5,503,508 A | 4/1996 | Amiguet et al. | |
| 6,272,748 B1 | 8/2001 | Smyth | |
| 2004/0032161 A1 | * 2/2004 | Smyth ........................ | 301/9.1 |
| 2004/0066086 A1 | * 4/2004 | Yoshimura ............. | 301/95.108 |

FOREIGN PATENT DOCUMENTS

| | | |
|---|---|---|
| DE | 43 39 755 C1 | 11/1993 |
| EP | 1 346 850 A1 | 9/2003 |
| WO | WO 02/051650 A1 | 7/2002 |

* cited by examiner

Primary Examiner—Russell D. Stormer
(74) Attorney, Agent, or Firm—Schwartz Law Firm P.C.

(57) ABSTRACT

A multi-piece vehicle wheel assembly includes a wheel center and a lightweight wheel rim. The wheel center defines a center hole and has an outer margin. The wheel rim has opposing inside and outside major surfaces. The outside major surface defines a rim bed for mounting a vehicle tire. The inside major surface includes an inwardly-extending annular shoulder. A plurality of circumferentially spaced rim bosses are formed with the annular shoulder of the rim, and are adapted for engaging the outer margin of the wheel center. A corresponding plurality of circumferentially spaced fastener holes are formed along the outer margin the wheel center, and are adapted for aligning with the rim bosses formed with the rim. A plurality of fasteners are received through the aligned rim bosses and fastener holes to attach the rim and the wheel center together.

8 Claims, 6 Drawing Sheets

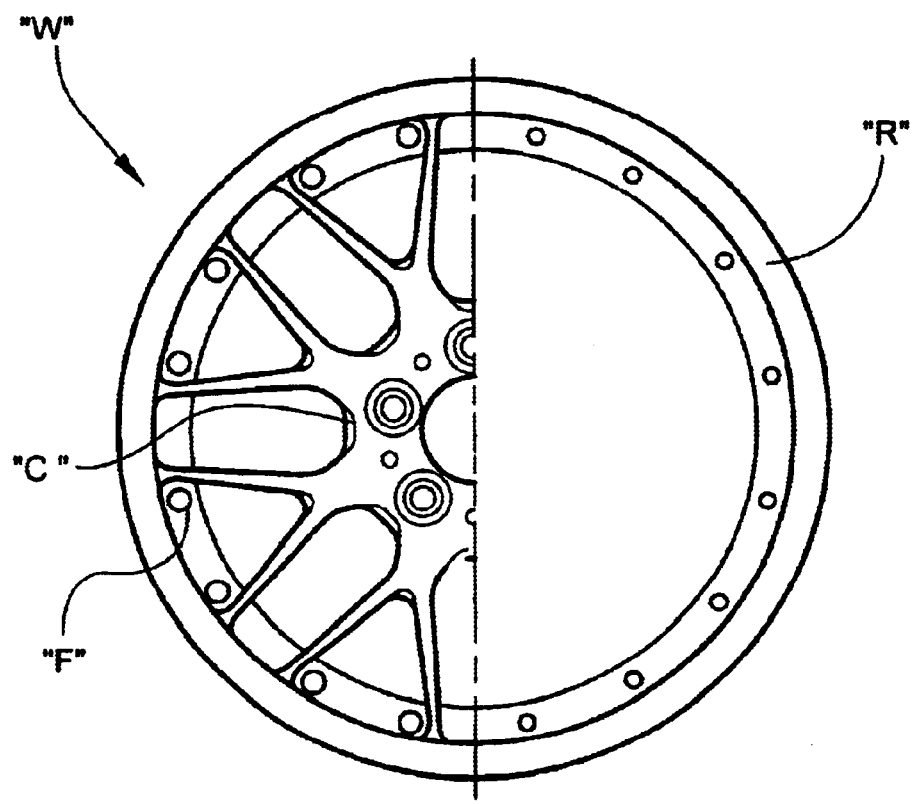
Fig. 1A
(Prior Art)
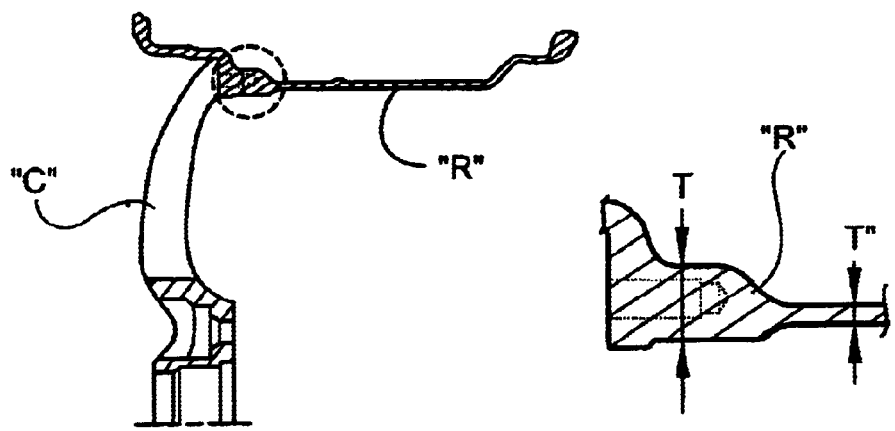
Fig. 1B
(Prior Art)
Fig. 1C
(Prior Art)

US 6,921,138 B2

MULTI-PIECE VEHICLE WHEEL ASSEMBLY

TECHNICAL FIELD AND BACKGROUND OF THE INVENTION

This invention relates to a multi-piece vehicle wheel assembly, and more specifically, to a wheel assembly incorporating a lightweight, reduced-mass aluminum alloy rim. The invention eliminates excess mass and inertia in an optimal multi-piece wheel construction applicable for both motor sport and normal road use.

In an effort to create the optimal wheel, design engineers utilize complex computer simulations and expensive equipment to form a precisely accurate and highly efficient multi-piece structure. The optimal design must account for every gram of weight in the wheel as each gram generates extreme levels of force at high speeds. Moreover, because vehicle performance is improved by reducing both the wheel mass and its rotational inertia, it is especially advantageous to remove inessential mass from the rim of the wheel. The further away a given mass is removed from the wheel centerline, the greater the reduction in wheel inertia.

Although aluminum alloy wheels are now fitted to the majority of vehicles, up until recently steel wheels were more common. While most alloy wheels are one-piece there are several classes of multi piece alloy wheels, including those that use the same construction path as all steel wheels. This invention concerns the specific class of alloy wheels wherein a wheel center is attached to a wheel rim. There are multi-piece and one-piece rim constructions in use where the rims have bolt holes through their flanged regions, and the wheel center and rim(s) are fastened together with screws/bolts and nuts, or similar function rivets. There is also a related class of rims which feature blind holes for fastening the center with tap screws/bolts. This invention is particularly applicable to this last category of rims and the wheels made with them.

FIGS. 1A, 1B, and 1C illustrate a conventional two-piece wheel construction "W" of the prior art. This particular wheel style is currently produced for OEM applications in vehicles, such as manufactured by BMW®, as well as AM applications for car enthusiasts. The wheel "W" includes a wheel center "C" and rim "R" joined together by suitable fasteners "F". The fasteners "F" extend through an outer margin of the wheel center "C" and penetrate respective blind fastener holes "H" formed with an inside major surface of the rim "R". As best shown in FIG. 1C, the rim "R" has a much thicker annular mass in an area "T" of the fastener holes "H" as compared to the area "T'" of rim "R". This added mass increases the weight of the rim and reduces the overall performance of the assembly as compared to conventional one-piece wheels.

SUMMARY OF INVENTION

Therefore, it is an object of the invention to provide a multi-piece vehicle wheel assembly which improves vehicle performance by reducing both the wheel mass and its rotational inertia.

It is another object of the invention to provide a multi-piece vehicle wheel assembly which offers a unique rim and wheel styling potential.

It is another object of the invention to provide a multi-piece vehicle wheel assembly including a wheel center and rim which are quickly and conveniently attached by suitable fasteners.

It is another object of the invention to provide a multi-piece vehicle wheel assembly which removes inessential mass from the rim of the wheel.

It is another object of the invention to provide a reduced-mass, lightweight vehicle wheel rim.

These and other objects of the present invention are achieved in the preferred embodiments disclosed below by providing a multi-piece vehicle wheel assembly. The assembly includes a wheel center and a lightweight wheel rim. The wheel center defines a center hole and has an outer margin. The wheel rim has opposing inside and outside major surfaces. The outside major surface defines a rim bed for mounting a vehicle tire. The inside major surface includes an annular shoulder. A plurality of circumferentially spaced rim bosses are formed with the annular shoulder of the rim, and are adapted for engaging the outer margin of the wheel center. A corresponding plurality of circumferentially spaced fastener holes are formed along the outer margin the wheel center, and are adapted for aligning with the rim bosses formed with the rim. A plurality of fasteners are received through the aligned rim bosses and fastener holes to attach the rim and the wheel center together.

The term "boss" is defined broadly herein to mean any protuberance which defines an opening sufficient for receiving a fastener therethrough.

According to another preferred embodiment of the invention, the rim bosses include protruding lands integrally formed with the annular shoulder of the rim. The lands define respective blind holes adapted for receiving the fasteners.

According to another preferred embodiment of the invention, the inside major surface of the rim defines respective pockets between adjacent ones of the lands to reduce the overall weight of the rim.

According to another preferred embodiment of the invention, the lands have respective internal screw threads, and the fasteners are complementary threaded bolts.

In another preferred embodiment the invention is a lightweight wheel rim adapted for being attached to a separate wheel center in a multi-piece vehicle wheel assembly. The wheel rim includes an outside major surface and an opposing inside major surface. The outside major surface defines a rim bed for mounting a vehicle tire. The inside major surface includes an annular shoulder. A plurality of circumferentially spaced rim bosses are formed with the annular shoulder, and are adapted for aligning with a corresponding plurality of circumferentially spaced fastener holes formed along an outer margin of the wheel center. The rim and wheel center are attached together by fasteners received through the aligned rim bosses and fastener holes.

BRIEF DESCRIPTION OF THE DRAWINGS

Some of the objects of the invention have been set forth above. Other objects and advantages of the invention will appear as the description proceeds when taken in conjunction with the following drawings, in which:

FIG. 1A is a plan view of a two-piece vehicle wheel assembly according to the prior art;

FIG. 1B is an enlarged, fragmentary cross-sectional view of the prior art assembly taken substantially along lines B—B of FIG. 1A;

FIG. 1C is an enlarged view of the encircled area in FIG. 1B;

DESCRIPTION OF THE PREFERRED EMBODIMENT AND BEST MODE

Figure 2:
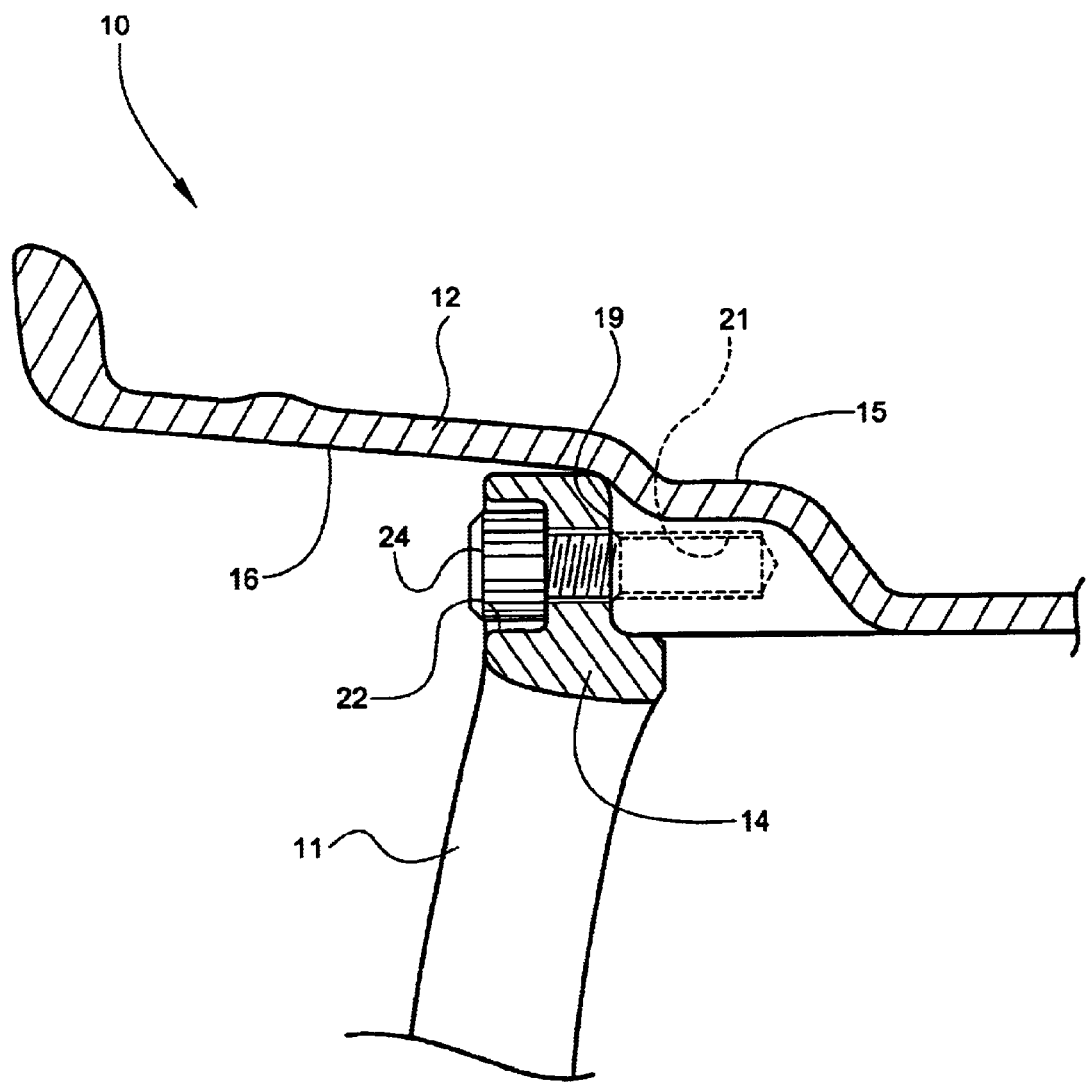
FIG. 2 is an enlarged, fragmentary cross-sectional view of a multi-piece vehicle wheel assembly according to one preferred embodiment of the present invention.

Referring now specifically to the drawings, a multi-piece vehicle wheel assembly according to the present invention is illustrated in FIG. 2, and shown generally at reference numeral 10. The wheel assembly 10 includes a wheel center 11 and rim 12. The wheel center 11 is formed in a conventional manner with a standard center hole for receiving wheel-mounting structure of the vehicle and an outer margin 14. In order to maximize the size of the wheel center 11, the diameter of the wheel center 11 is preferably slightly less than the outermost inner diameter of the wheel rim 12. A larger wheel center 11 promotes the aesthetics of the assembly 10.

Figure 3:
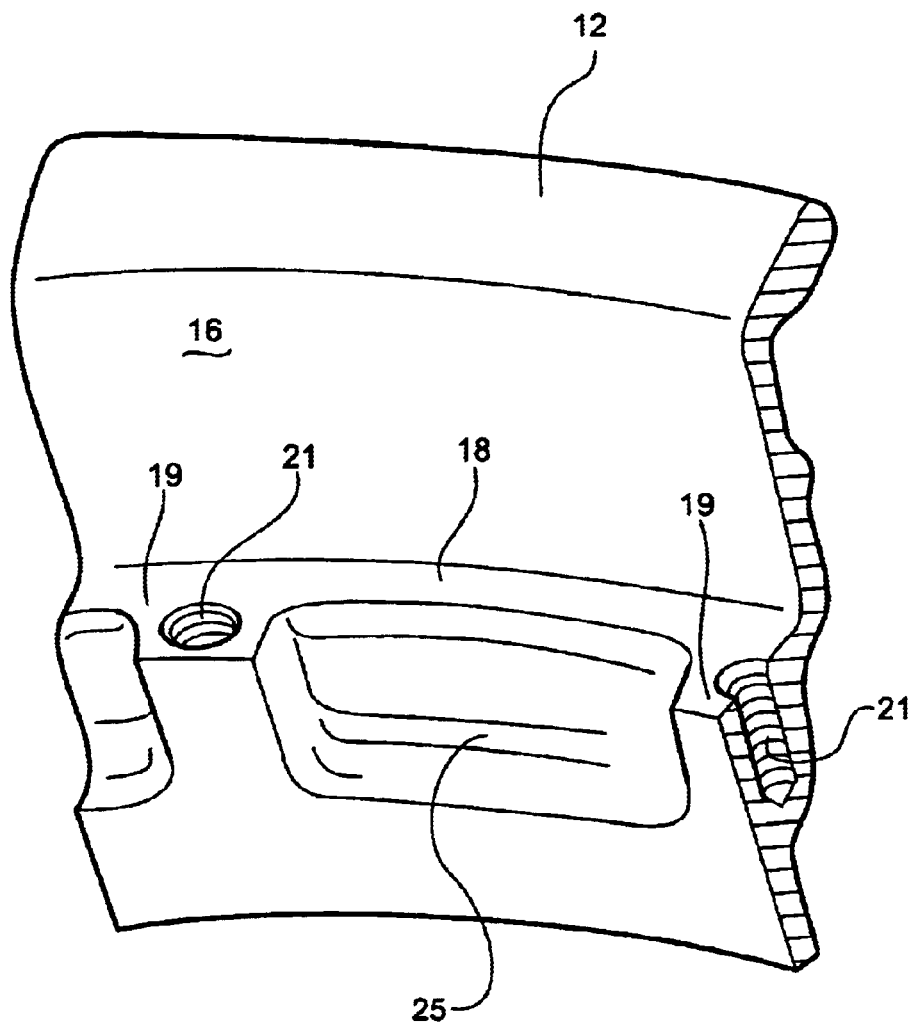
FIG. 3 is a fragmentary perspective view of the present wheel rim.
Figure 4:
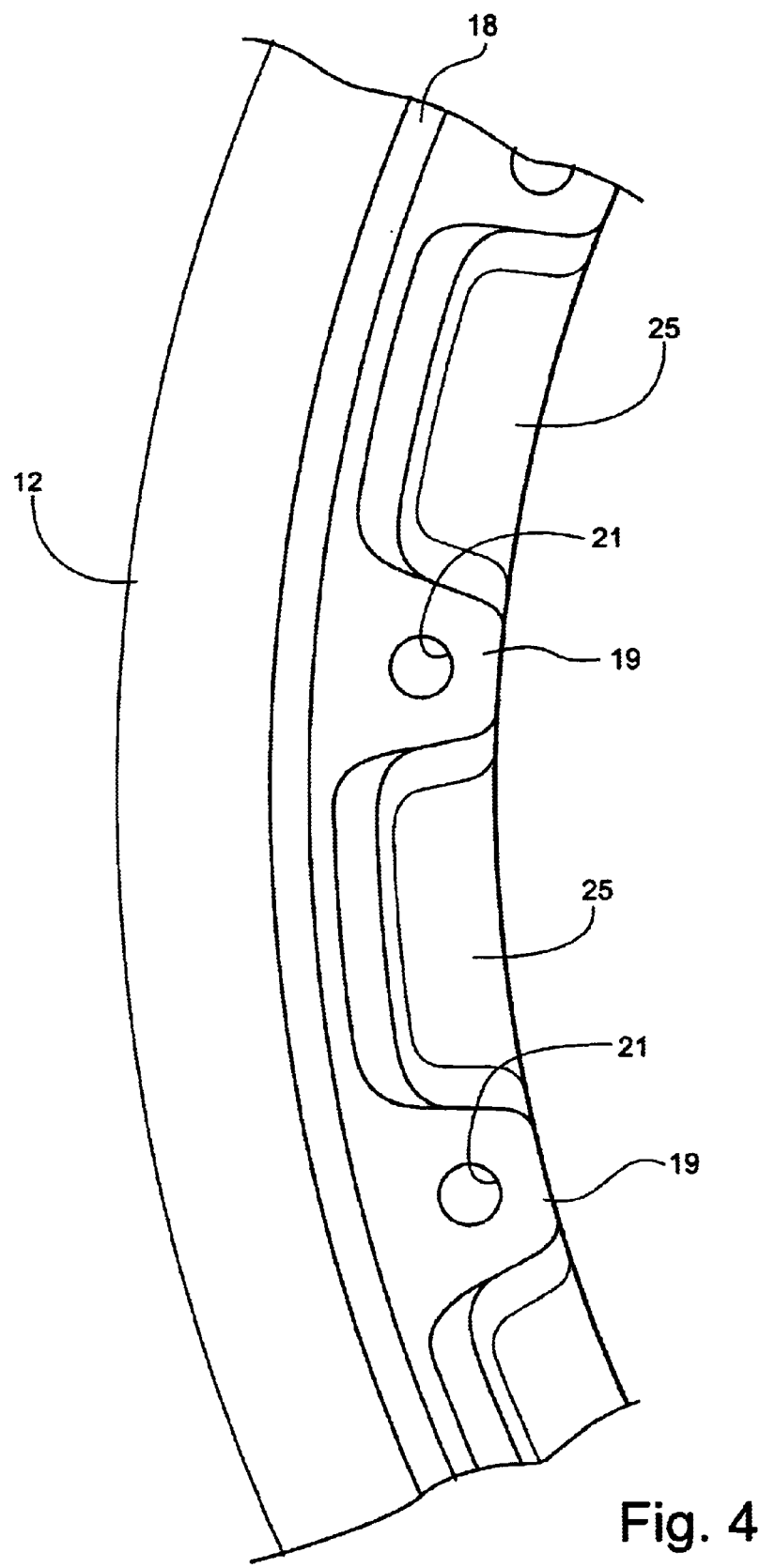
FIG. 4 is an enlarged, fragmentary plan view of the wheel rim.

Referring to FIGS. 2, 3, and 4, the wheel rim 12 has opposing outside and inside major surfaces 15 and 16. The outside major 15 surface defines a contoured rim bed for mounting the vehicle tire. The inside major surface 16 has a generally radially-extending annular shoulder 18. A number of circumferentially spaced rim bosses 19 are formed with the annular shoulder 18 and are adapted for engaging the outer margin 14 of the wheel center 11, as shown in FIG. 2. Preferably, the rim bosses 19 comprise protruding lands with respective internally-threaded blind holes 21 adapted for aligning with corresponding fastener holes 22 formed with the outer margin 14 of the wheel center 11. Externally-threaded bolts 24 are received through the aligned fastener holes 22 and blind holes 21 to securely attach the wheel center 11 and rim 12 together. According to one embodiment, in a 20-inch diameter/8.5-inch wide rim, the wheel assembly 10 uses 20 bolts 24 received through equally spaced fastener holes 22 and blind holes 21 formed in the wheel center 11 and rim 12.

Figure 5:
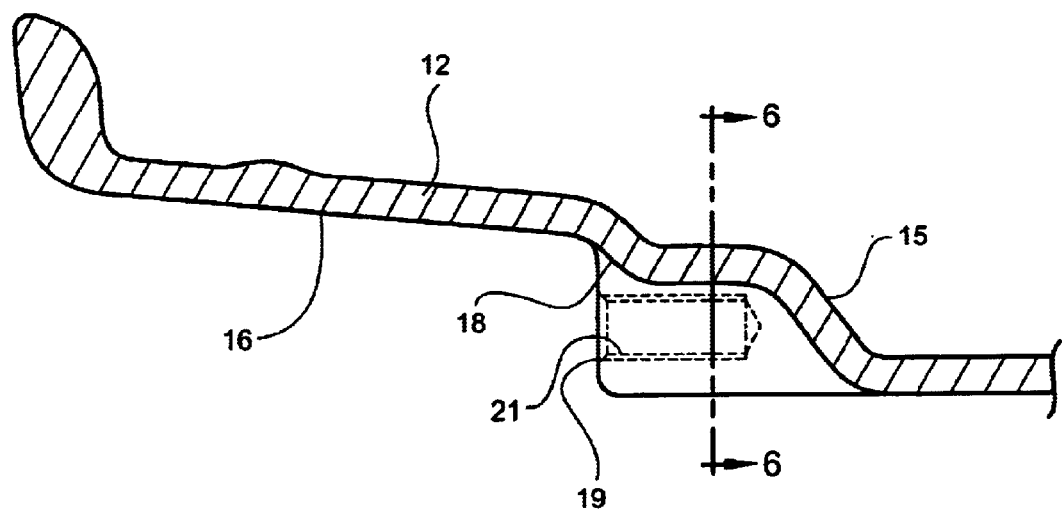
FIG. 5 is a fragmentary cross-sectional view of the wheel rim.
Figure 6:
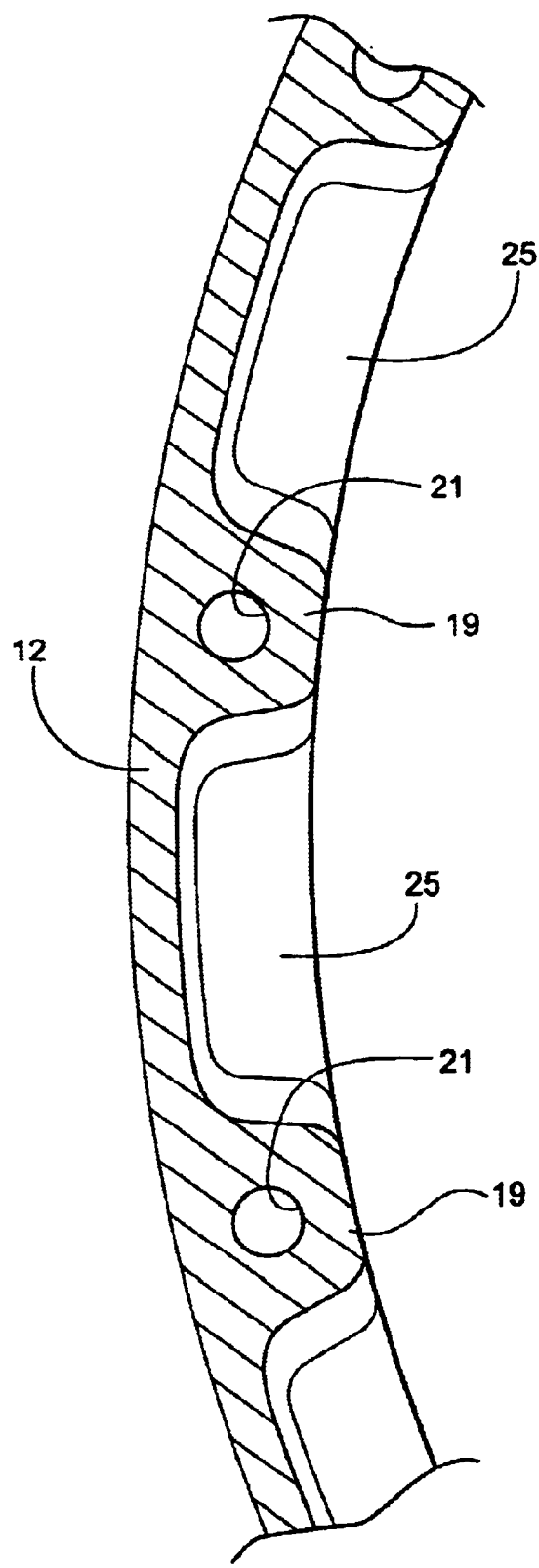
FIG. 6 is a fragmentary cross-sectional view of the wheel rim taken substantially along line 6—6 of FIG. 5.

As best shown in FIGS. 3 and 4, the inside major surface 16 of the rim 12 defines respective pockets 25 between adjacent ones of the rim bosses 19 to reduce the overall mass and inertia of the rim 12. In a conventional two-piece wheel construction "W", such as shown in FIGS. 1A–1C, the area "T" between the rim bosses 19 is entirely filled creating an annular section of increased mass. By forming the pockets 25 between the bosses 19, the overall rim mass is reduced by approximately 10% to 15% and by approximately 75% in the area of the shoulder 18. Because all the reduction is near the maximum diameter of the wheel assembly 10, there is an even more significant reduction in wheel inertia. The thickness or mass of the rim 12 in the present wheel assembly 10 is essentially constant throughout, as shown in FIGS. 5 and 6, except in the protruding rim bosses 19. The bosses 19 add only a minimum thickness necessary to form the blind holes 21.

The projecting rim bosses 19 described above can be formed directly by the rim casting, forging and/or shaping process. They can also be produced from a conventional tapped hole rim, as shown in FIGS. 1A–1C, by any metal subtraction process such as contour milling or EDM, or by any combination of processes. Although not shown, the cross-hatched rim section illustrated in FIGS. 2 and 5 may extend on either side of the protruding rim boss. In other words, the bosses can be located on either side of the general rim contour.

A two-piece wheel assembly is described above. Various details of the invention may be changed without departing from its scope. Furthermore, the foregoing description of the preferred embodiment of the invention and best mode for practicing the invention are provided for the purpose of illustration only and not for the purpose of limitation—the invention being defined by the claims.

I claim:

1. A multi-piece vehicle wheel assembly, comprising:
   (a) a wheel center defining a center hole and having an outer margin;
   (b) a lightweight wheel rim having opposing inside and outside major surfaces, the outside major surface defining a rim bed for mounting a vehicle tire, and the inside major surface comprising an annular shoulder extending inwardly towards said wheel center;
   (c) a plurality of circumferentially spaced rim bosses formed with the annular shoulder of said rim and adapted for engaging the outer margin of said wheel center;
   (d) a corresponding plurality of circumferentially spaced fastener holes formed along the outer margin said wheel center and adapted for aligning with the rim bosses formed with said rim; and
   (e) a plurality of fasteners received through the aligned rim bosses and fastener holes to attach said rim and said wheel center together.

2. A multi-piece vehicle wheel assembly according to claim 1, wherein said rim bosses comprise protruding lands integrally formed with the annular shoulder of said rim, and defining respective blind holes adapted for receiving said fasteners.

3. A multi-piece vehicle wheel assembly according to claim 2, wherein the inside major surface of said rim defines respective pockets between adjacent ones of said lands to reduce the overall weight of said rim.

4. A multi-piece vehicle wheel assembly according to claim 3, wherein said lands comprise respective internal screw threads, and wherein said fasteners comprise complementary threaded bolts.

5. A lightweight vehicle wheel rim adapted for being attached to a separate wheel center in a multi-piece vehicle wheel assembly, said wheel rim comprising:
   (a) an outside major surface defining a rim bed for mounting a vehicle tire;
   (b) an inside major surface opposite said outside major surface and including an inwardly-extending annular shoulder; and
   (c) a plurality of circumferentially spaced rim bosses formed with said annular shoulder, and adapted for aligning with a corresponding plurality of circumferentially spaced fastener holes formed along an outer margin of the wheel center, such that said rim and wheel center are attached together by fasteners received through the aligned rim bosses and fastener holes.

6. A lightweight vehicle wheel rim according to claim 5, wherein said rim bosses comprise protruding lands integrally formed with said annular shoulder and defining respective blind holes adapted for receiving the fasteners.

7. A lightweight vehicle wheel rim according to claim 6, wherein said inside major surface defines respective pockets between adjacent ones of said lands to reduce the overall weight of said rim.

8. A multi-piece vehicle wheel assembly according to claim 7, wherein said lands comprise respective internal screw threads, and wherein said fasteners comprise complementary threaded bolts.

* * * * *